(12) United States Patent
Kim et al.

(10) Patent No.: US 11,801,819 B2
(45) Date of Patent: Oct. 31, 2023

(54) BRAKING APPARATUS OF VEHICLE

(71) Applicant: HL MANDO CORPORATION, Pyeongtaek-si (KR)

(72) Inventors: Min Woo Kim, Yongin-si (KR); Min Hye Yu, Uiwang-si (KR)

(73) Assignee: HL Mando Corporation, Pyeongtaek-si (KR)

( * ) Notice: Subject to any disclaimer, the term of this patent is extended or adjusted under 35 U.S.C. 154(b) by 254 days.

(21) Appl. No.: 17/169,263

(22) Filed: Feb. 5, 2021

(65) Prior Publication Data
US 2021/0237706 A1 Aug. 5, 2021

(30) Foreign Application Priority Data
Feb. 5, 2020 (KR) .................. 10-2020-0013699

(51) Int. Cl.
*B60T 17/22* (2006.01)
*B60T 13/74* (2006.01)

(52) U.S. Cl.
CPC ....... *B60T 13/745* (2013.01); *B60T 2270/414* (2013.01)

(58) Field of Classification Search
CPC ................. B60T 13/745; B60T 13/741; B60T 2270/414; B60T 2270/402; B60T 2270/413; B60T 8/885; B60T 8/17; B60T 17/22; H02K 11/33; H02K 7/102; H02H 7/08; H02H 7/0833; H02H 7/0827; H02H 7/0856; H02H 7/09; H02H 7/093; H02P 15/00; H02P 3/00; H02P 3/26
See application file for complete search history.

(56) References Cited

U.S. PATENT DOCUMENTS

| | | | |
|---|---|---|---|
| 2004/0238299 A1* | 12/2004 | Ralea | B60T 17/221 188/156 |
| 2007/0138861 A1* | 6/2007 | Kawahara | B60T 13/741 303/20 |
| 2014/0015454 A1* | 1/2014 | Kunimitsu | H01M 10/482 320/134 |
| 2017/0182984 A1* | 6/2017 | Masuda | B60T 17/18 |
| 2018/0056965 A1* | 3/2018 | Houtman | B60T 8/3255 |
| 2019/0093720 A1* | 3/2019 | Masuda | H02P 21/00 |
| 2020/0023827 A1* | 1/2020 | Van Thiel | B60T 13/74 |
| 2021/0257927 A1* | 8/2021 | Zhou | H03K 17/691 |
| 2022/0182041 A1* | 6/2022 | Tesu | H02P 27/08 |

* cited by examiner

*Primary Examiner* — Nicholas J Lane
*Assistant Examiner* — Stephen M Bowes
(74) *Attorney, Agent, or Firm* — Morgan, Lewis & Bockius LLP

(57) ABSTRACT

A braking apparatus includes a controller disposed in a first area to which first power is applied from a first power supply and configured to output a control signal for controlling a braking force applied to a wheel, a driver disposed in a second area to which second power that is greater than the first power is applied from a second power supply and configured to output a driving signal for driving a motor in response to the control signal, and an isolator configured to insulate the controller from the driver and transmit the control signal to the driver. A terminal through which the first power is applied to the first area is separated from a terminal through which the second power is applied to the second area. A ground of the first area is separated from a ground of the second area.

11 Claims, 5 Drawing Sheets

BRAKING APPARATUS OF VEHICLE

CROSS-REFERENCE TO RELATED APPLICATION

This application claims priority to and the benefit of Korean Patent Application No. 2020-0013699, filed on Feb. 5, 2020, the disclosure of which is incorporated herein by reference in its entirety.

BACKGROUND

1. Field of the Invention

The present invention relates to a braking apparatus of a vehicle.

2. Discussion of Related Art

A brake system for braking is necessarily mounted in a vehicle, and a variety of brake systems for providing stronger and more stable braking have been proposed recently.

Among the brake systems, an electronic brake system includes a motor for generating a hydraulic pressure in a pressure chamber, a wheel cylinder (hydraulic brake) mounted on a wheel of a vehicle, a plurality of solenoid valves which transmit the hydraulic pressure to the wheel cylinder, and a braking apparatus for controlling driving of the motor and the solenoid valve, and these components are compactly embedded in a hydraulic block.

The existing electronic brake system has a problem in that, since a power of 12 V, which is a relatively low voltage, is applied to a motor driver and an inverter which constitute a main service brake, responsiveness of the main service brake is degraded so that it is not possible to quickly respond to a dangerous situation.

In addition, the existing electronic brake system has a problem in that, since the power of 12 V, which is a relatively low voltage, is applied and thus an electrical wire of a certain volume or more should be provided so as to allow a relatively large current to flow, there is a difficulty in miniaturization of an electronic brake system such that fuel efficiency is degraded.

Thus, research is being carried out to apply a power of 48 V in addition to the existing power of 12 V to a braking apparatus of the electronic brake system. However, a solution for eliminating the risk due to coexistence of the power of 12 V and the power of 48 V in a single braking apparatus has not yet been proposed.

When both of the power of 12 V and the power of 48 V are applied to a single braking apparatus without the above solution, a short circuit between lines of the power of 12 V and the power of 48 V may occur, and thus electronic devices in the braking apparatus may be damaged such that there occurs a problem of seriously degrading stability of a vehicle.

SUMMARY OF THE INVENTION

The present invention is directed to a braking apparatus of a vehicle, which allows two different types of power supplies to be stably supplied to a single braking apparatus and is capable of eliminating the risk due to coexistence of the two different types of power in the single braking apparatus.

According to an aspect of the present invention, there is provided a braking apparatus including a controller disposed in a first area to which first power is applied from a first power supply in one area of a circuit board and configured to output a control signal for controlling a braking force applied to a wheel, a driver disposed in a second area to which second power that is greater than the first power is applied from a second power supply in the other area of the circuit board and configured to output a driving signal for driving a motor in response to the control signal, and an isolator configured to insulate the controller from the driver and transmit the control signal to the driver, wherein a terminal through which the first power is applied to the first area is separated from a terminal through which the second power is applied to the second area, and a ground of the first area is separated from a ground of the second area.

The braking apparatus may further include a converter disposed in the first area and configured to convert the first power, and a power controller disposed in the first area and configured to provide the converted first power to the controller.

The braking apparatus may further include a wake-up part disposed in the first area and configured to transmit, when braking control is required, a wake-up signal to the power controller on the basis of a corresponding signal, and the power controller may provide the converted first power to the controller in response to the wakeup signal.

The braking apparatus may further include an inverter disposed in the second area and configured to convert the second power into alternating-current (AC) power and provide the AC power to the motor in response to the driving signal.

The braking apparatus may further include a first sensor configured to detect information on a position of a rotation angle of the motor, and the motor and the first sensor may be disposed outside the second area.

The first sensor may directly transmit the information on the position of the rotation angle of the motor to the controller.

The first sensor may receive the first power converted by the converter.

The braking apparatus may further include a second sensor configured to detect an output current of the inverter, and the second sensor may be disposed outside the second area.

The second sensor may directly transmit the output current to the controller.

The second sensor may receive the first power converted by the converter.

The braking apparatus may further include an interrupter configured to interrupt the second power from being applied to the driver, and the controller may transmit an interruption signal of the interrupter through the isolator on the basis of pressure information received from the outside.

BRIEF DESCRIPTION OF THE DRAWINGS

The above and other objects, features and advantages of the present invention will become more apparent to those skilled in the art by describing exemplary embodiments thereof in detail with reference to the accompanying drawings, in which.

DETAILED DESCRIPTION OF EXEMPLARY EMBODIMENTS

Figure 1:
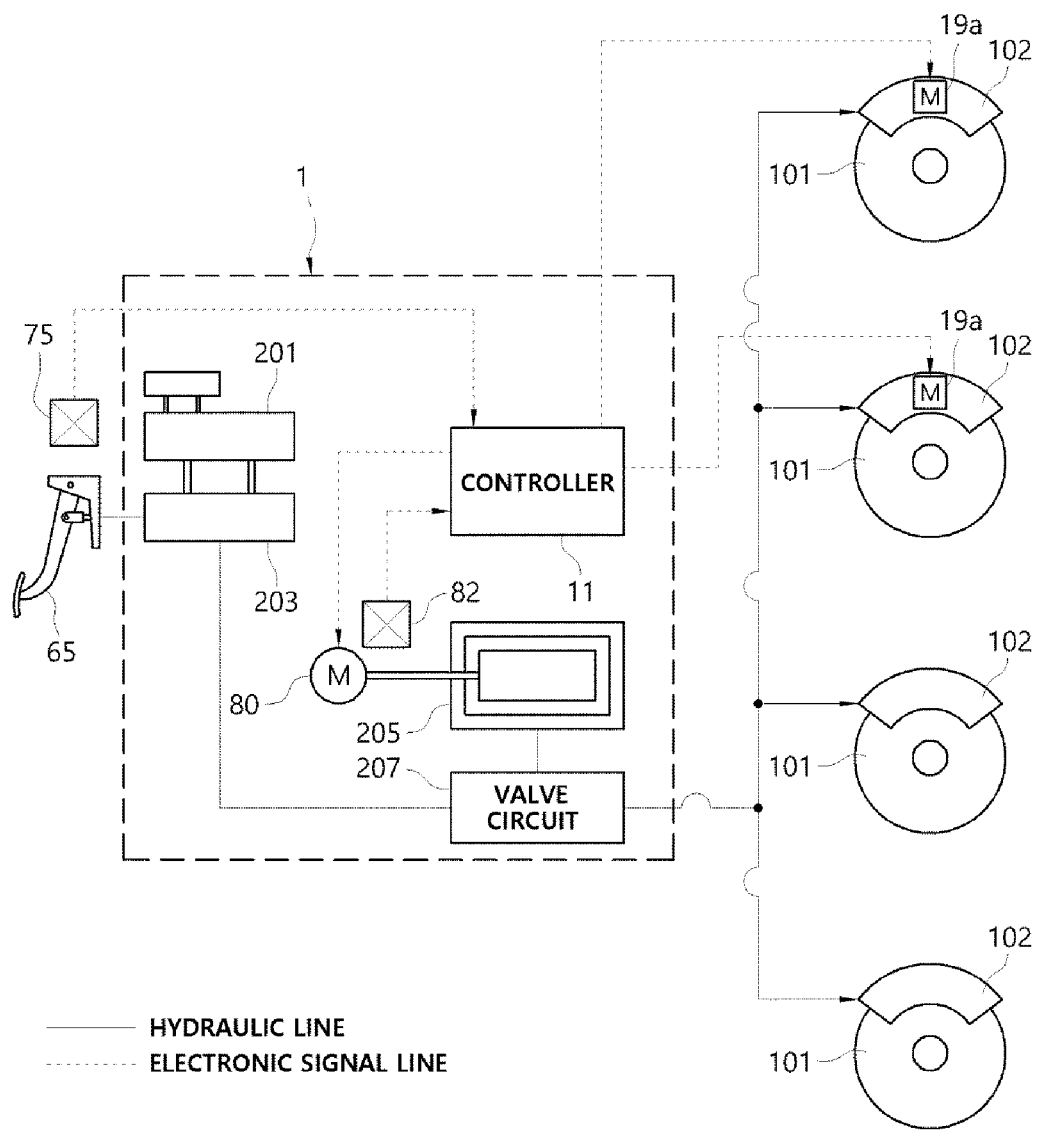
FIG. 1 is a diagram illustrating a schematic structure of a braking apparatus to which a braking apparatus according to one embodiment of the present invention is applied.

Hereinafter, exemplary embodiments of the present invention will be fully described in detail with reference to the accompanying drawings so that those skilled in the art can easily implement the present invention. The present invention may be implemented in various different forms, and thus it is not limited to the embodiments which will be described herein. In the drawings, some portions not related to the description will be omitted in order to clearly describe the present invention, and the same or similar reference numerals are given to the same components throughout this specification.

It should be understood that the terms of "comprise" and "have" specify the presence of stated herein features, numbers, steps, operations, components, elements, or a combination thereof, but do not preclude the presence or probability of addition of one or more another features, numbers, steps, operations, components, elements, or a combination thereof.

A braking apparatus to which one embodiment of the present invention is applied is an integrated electronic brake and may perform a function of an anti-lock brake system (ABS) which prevents wheel lock during braking to reduce a braking distance and secure stability of a vehicle attitude, a function of an electric parking brake (EPB) system which is electronically controlled unlike a wire method, a function of an electronic stability control (ESC) apparatus or an electronic stability program (ESP) control apparatus which controls a driving force and a braking force to prevent a vehicle from slipping during traveling, and a function of a traction control system (TCS) which controls a driving force to prevent a wheel from spinning due to an excessive driving force when a vehicle is started or accelerated on a slippery road surface such as a snowy road surface or a wet road surface.

That is, a braking apparatus to which one embodiment of the present invention is applied is an integrated dynamic brake (IDB) which directly drives a pressure piston using a motor to generate a braking pressure, replaces a vacuum booster, and includes all functions of ESC.

When a power of 48 V is applied to the existing internal combustion engine vehicle having a 12 V system, a volume of electrical wires may be decreased by reducing a current to ¼, and carbon dioxide reduction, an increase in fuel efficiency, and a quick response may be expected. In this regard, the 48 V mild hybrid market is expected to grow significantly.

In this regard, it is required to secure stability between the power of 12 V and the power of 48 V. That is, the issue of how well the risk, which may occur due to coexistence of two different types of power in one electronic control unit (ECU), is eliminated and managed is becoming important. For example, when a short circuit occurs between the two types of power, this may cause physical burning of electronic components in the ECU so that stability of the entirety of the vehicle may be degraded.

As described above, in order to protect the electronic components and secure stability of the vehicle, the power of 12 V and the power of 48 V should satisfy requirements related to insulation including leakage current specifications.

FIG. 1 is a diagram illustrating a schematic structure of a braking apparatus to which a braking apparatus according to one embodiment of the present invention is applied.

Referring to FIG. 1, a braking apparatus 1 may include a reservoir 201, a master cylinder 203, a hydraulic pressure supply device 205, a valve circuit 207, a motor position sensor (MPS) 82, and a controller 11.

When a parking brake signal is received after a vehicle is stopped, the controller 11 controls a first motor 19a to operate a caliper 102 formed in each of a plurality of wheels 101.

When a driver steps on a brake pedal 65, the master cylinder 203 presses and discharges a pressing medium such as brake oil accommodated therein. Thus, a reaction force according to a pedal effort of a brake is provided to the driver. In addition, a pedal travel switch (PTS) 75 detects an external force generated at the brake pedal 65 from the outside of the vehicle and provides the detected external force to the controller 11.

The hydraulic pressure supply device 205 generates a hydraulic pressure according to a position of the brake pedal 65 and transmits the generated hydraulic pressure to a wheel cylinder of the wheel 101 such that braking of the vehicle is performed.

In order to generate the hydraulic pressure, the hydraulic pressure supply device 205 includes a second motor 80. In addition, the braking apparatus 1 includes the MPS 82. The MPS 82 is a motor position sensor and measures an exact rotation position of the motor 80 included in the hydraulic pressure supply device 205 to provide the rotation position to the controller 11.

The valve circuit 207 controls a plurality of relief valves for controlling flow paths between the hydraulic pressure supply device 205 and the wheel cylinders, a plurality of outlet valves for controlling flow paths between the master cylinder 203 and the wheel cylinders, a simulator valve for forming a pedal feeling, and a cut valve for controlling a backup flow path between the master cylinder 203 and the wheel cylinder.

It is proposed a design method in which the braking system according to one embodiment of the present invention separates electronic components, which receive power from a low voltage (e.g., 12 V) battery among a plurality of electronic components of the braking apparatus 1, from electronic components, which receive power from a high voltage (e.g., 48 V) battery in a circuit or physical manner, thereby stably supplying two different magnitudes of power to one braking apparatus 1.

Figure 2A:
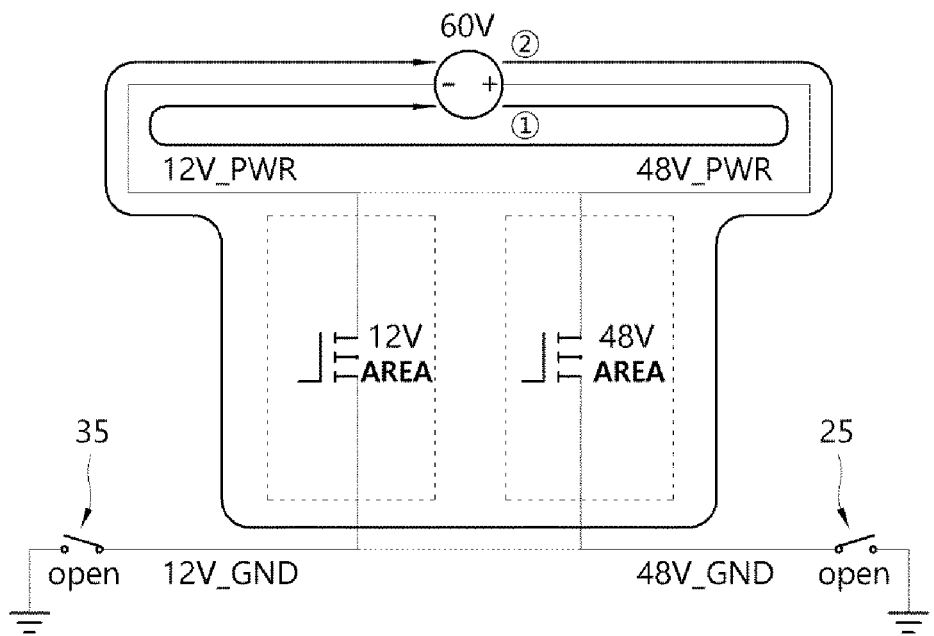
FIGS. 2A to 2C are exemplary diagrams for finding an idea satisfying requirements related to insulation of a 12V_PWR and a 48V_PWR.
Figure 2B:
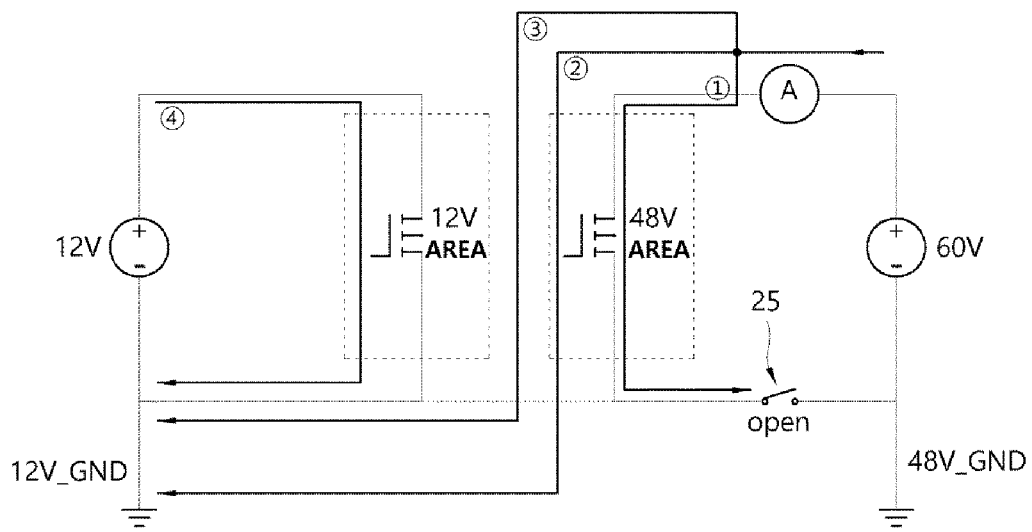
Figure 2C:
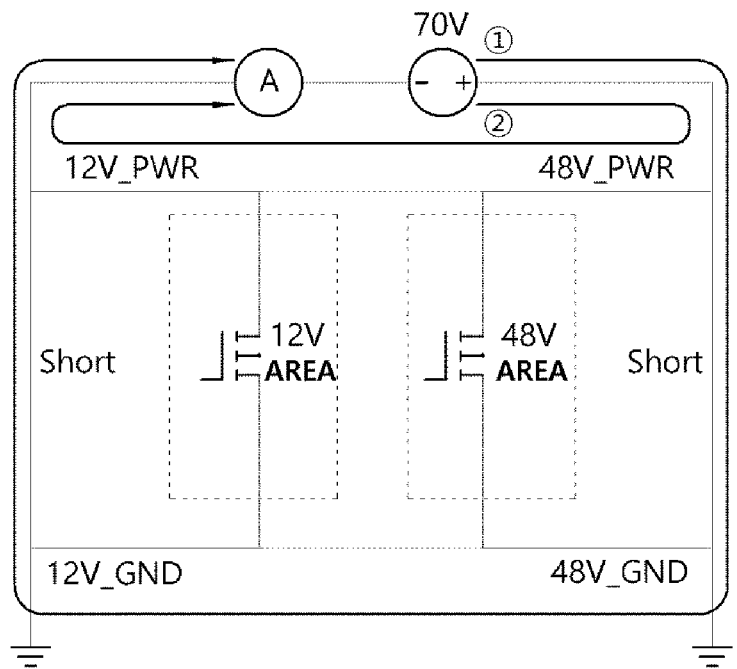

FIGS. 2A to 2C are exemplary diagrams for finding an idea satisfying requirements related to insulation of a 12V_PWR and a 48V_PWR.

Referring to FIGS. 2A to 2C, in the braking apparatus according to one embodiment of the present invention, an area in which electronic components receiving power from a low voltage (e.g., 12 V) battery are located is simply indicated as a 12V region, and an area in which electronic components receiving power from a high voltage (e.g., 48 V) battery are located is simply indicated as a 48V area. However, the present invention is not limited thereto, and it is obvious that an actual voltage of each of the low voltage and the high voltage may be changed.

In addition, in the 12V area of the braking apparatus, a portion connected to a (+) terminal of the 12 V battery is indicated by 12V_PWR, and a portion connected to a (−) terminal (i.e., a ground terminal) of the 12 V battery is indicated by 12V_GND. In the 48V area of the braking apparatus, a portion connected to a (+) terminal of the 48 V battery is indicated by 48V_PWR, and a portion connected to a (−) terminal (i.e., a ground terminal) of the 48 V battery is indicated by 48V_GND.

In FIG. 2A, in consideration of a path ①, when the 12V_PWR and 48V_PWR are integrated, since the 12V_PWR and the 48V_PWR are short-circuited, a current of 60 μA or more flows and thus internal resistance becomes smaller than reference resistance such that internal insulation strength requirements are not be satisfied.

In addition, in consideration of the path ①, when the 12V_PWR and the 48V_PWR are separated from each other, a current does not flow between the 12V_PWR and the 48V_PWR and thus the internal resistance becomes larger than the reference resistance, thereby satisfying internal insulation strength requirements.

In addition, in consideration of a path ②, when the 12V_GND and 48V_GND are integrated, owing to a voltage drop due to internal resistance αΩ of electronic components provided in the 12 V and 48V areas and a leakage current (20 μA) of a 48 V motor drive integrated circuit (IC), internal insulation strength requirements may be conditionally satisfied due to the internal resistance αΩ of the electronic components.

In addition, in consideration of the path ②, when the 12V_GND and the 48V_GND are separated from each other, a current does not flow and thus the internal resistance becomes larger than the reference resistance, thereby satisfying internal insulation strength requirements.

Thus, in order to satisfy internal insulation strength requirements, it is necessary to separate the 12V_PWR and the 12V_GND from the 48V_PWR and the 48V_GND, respectively.

Referring to FIG. 2B, power in a 12V area is connected to a (+) terminal of a 12 V battery, and power in a 48V area is connected to a (+) terminal of a 60 V battery. In addition, a ground of the 12V area is connected to a (−) terminal of the 12 V battery, and a ground of the 48V area is open. According to leakage current requirements, a leakage current (measured through a component A) flowing in the 48V_PWR should be less than a reference current.

In addition, in consideration a path ①, since the 48V_GND is open, no current flows along the path ①.

In addition, in consideration of a path ②, when the 12V_GND and the 48V_GND are integrated, a current path is formed with the 12V_GND. In the case of a sleep mode at a temperature of 25° C., a leakage current of a 48 V motor drive IC is greater than or equal to the reference current, thus leakage current requirements are not satisfied.

In addition, in consideration of the path ②, when the 12V_GND and the 48V_GND are separated from each other, a current path is not formed and thus the leakage current becomes zero, thereby satisfying leakage current requirements.

In addition, in consideration of a path ③, when the 12V_PWR and the 48V_PWR are integrated, a current path is formed with the 12V_GND and thus a leakage current that is greater than or equal to the reference current flows such that the leakage current requirements are not satisfied. In addition, in consideration of a path ③, when the 12V_PWR and the 48V_PWR are separated, a current path is not formed, thereby satisfying current requirements.

Thus, it can be seen that, in order to satisfy the leakage current requirements, it is necessary to separate the 12V_PWR and the 12V_GND from the 48V_PWR and the 48V_GND, respectively.

Referring to FIG. 2C, a 12V_PWR is connected to a (−) terminal of a 70 V battery, and a 48V_PWR is connected to a (+) terminal of the 70 V battery.

In consideration of a path ①, when the 12V_GND and the 48V_GND are integrated, a current path is formed from the 48V_GND to the 12V_GND, power/ground/communication lines in a 12V area are short-circuited, power/ground lines in a 48V area are short-circuited, and thus a current that is greater than a reference current flows such that leakage current requirements are not satisfied.

In addition, in consideration of the path ①, when the 12V_GND and the 48V_GND are separated from each other, a current path is not formed, thereby satisfying leakage current requirements.

In addition, in consideration of a path ②, when the 12V_PWR and the 48V_PWR are integrated, a current path is formed from the 48V_PWR to the 12V_PWR, and since it is in a short-circuit state, a current that is greater than the reference current flows such that the leakage current requirements are not satisfied. In addition, in consideration of the path ②, when the 12V_PWR and the 48V_PWR are separated from each other, a current path is not formed, thereby satisfying leakage current requirements.

In summary, the power and the ground in the 12V and 48V areas need to be separated from each other. Thus, as described above, the braking apparatus according to one embodiment of the present invention suggests that the power and the ground in the 12V and 48V areas are separated from each other.

Figure 3A:
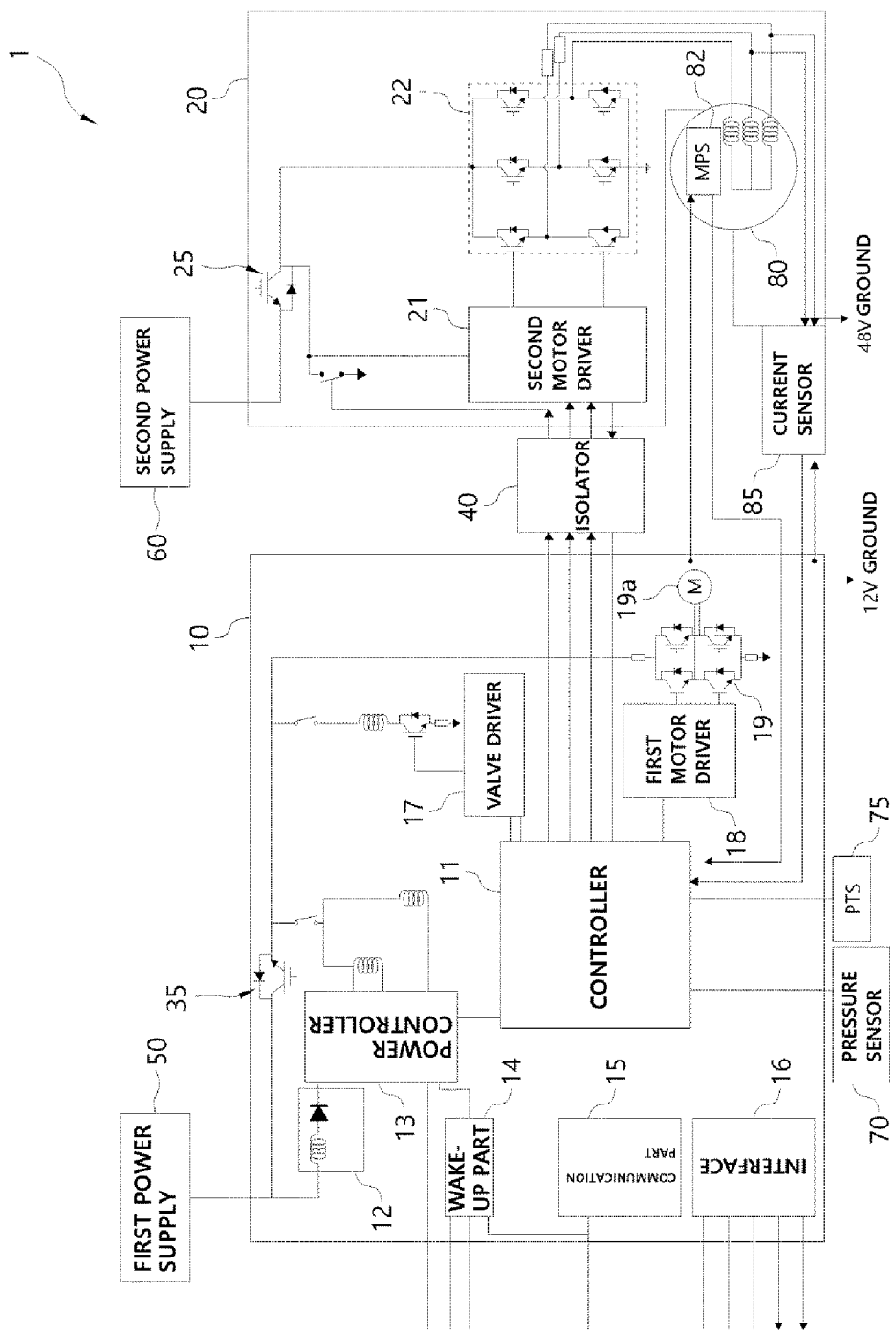
FIGS. 3A and 3B are an exemplary diagram for describing the braking apparatus according to one embodiment of the present invention in detail.
Figure 3B:
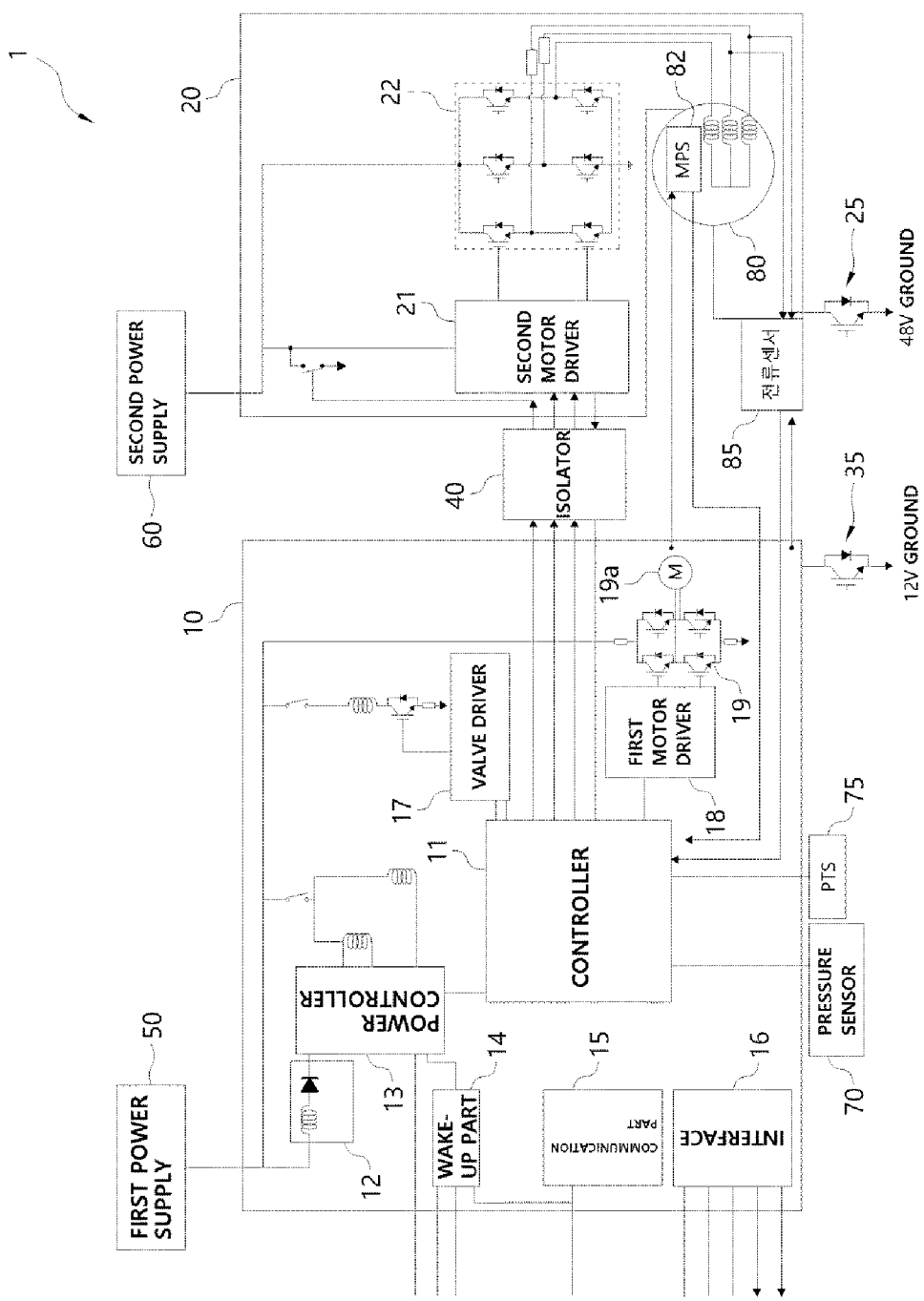

FIGS. 3A and 3B are exemplary diagrams for describing the braking apparatus according to one embodiment of the present invention in detail.

Referring to FIGS. 3A and 3B, the braking apparatus 1 according to one embodiment of the present invention may include a first area 10 (e.g., a 12V area) in which electronic components receiving low voltage (e.g., 12 V) power from a first power supply 50 are disposed, a second area 20 (e.g., a 48V area) in which electronic components receiving high voltage (e.g., 48 V) power from a second power supply 60 are disposed, and connectors connected to the first power supply 50 and the second power supply 60. In one embodiment of the present invention, an example in which a low voltage is 12 V and a high voltage is 48 V is described, but the present invention is not limited thereto, and it will be apparent in the technical field to which the present invention pertains that an applied voltage may be varied according to specifications of a vehicle.

In one embodiment of the present invention, the first area 10 and the second area 20 may be disposed on the same printed circuit board (PCB) and may be completely separated from each other in a circuit or physical manner.

In the braking apparatus 1 according to one embodiment of the present invention, an isolator 40 may be disposed between the first area 10 receiving the power from the first power supply 50 and the second area 20 receiving the power from the second power supply 60.

For example, in one embodiment of the present invention, the first power supply 50 may be a battery which supplies a power of 12 V, and the second power supply 60 may be a battery which supplies a power of 48 V. However, as described above, the present invention is not limited thereto.

As described with reference to FIGS. 2A to 2C, in the braking apparatus 1 according to one embodiment of the present invention, the first area 10 and the second area 20 may have separate terminals, to which power is supplied from the first power supply 50 and the second power supply 60, and separate grounds. In addition, the first area 10 and the second area 20 may be disposed on a single PCB to be separated in a circuit manner or may be provided on different PCBs to be physically separated.

In FIGS. 3A and 3B, although the first and second power supplies 50 and 60 are illustrated as being disposed on one circuit board, the present invention is not limited thereto. Connectors to which the power is applied from the first and second power supplies 50 and 60 may be disposed on a circuit board, and corresponding connectors receive the power from the first power supply 50 and second power supply 60, which are provided on separate circuit boards or areas, to provide the power to the first area 10 and the second area 20.

The first area 10 for receiving the power from the first power supply 50 may include a controller 11, a power converter 12, a power controller 13, a wake-up part 14, a communication part 15, an interface 16, a valve driver 17, a first motor driver 18, a first inverter 19, and a first motor 19a.

In addition, the second area 20 for receiving the power from the second power supply 60 may include a second motor driver 21 and a second inverter 22. A second motor 80 for receiving a driving signal from the second inverter 22 may be disposed outside the second area 20, and a current sensor 85 for measuring a current input from the second inverter 22 to the second motor 80 may also be disposed outside the second area 20.

In FIGS. 3A and 3B, although components of the first area 10 and the second area 20 are illustrated, the present invention is not limited thereto, and more components may be disposed in the first area 10 or the second area 20.

The power converter 12 may convert power supplied from the first power supply 50 into a voltage of a different magnitude and provides the voltage to the power controller 13. For example, the power converter 12 may boost a voltage of 12 V and provide the boosted voltage to the power controller 13. In addition, the power converter 12 may step down the voltage of 12 V and provide the stepped-down voltage to the components in the first area 10 or another component.

For example, the power controller 13 may be implemented as an application specific integrated circuit (ASIC) and may supply the power converted by the power converter 12 to the controller 11.

In the first area 10, although the converted power from the power controller 13 is illustrated as being applied to the controller 11, and the power supplied from the first power supply 50 is illustrated as being directly applied to some components (the valve driver 17 and the first inverter 19), the present invention is not limited thereto, and the power from the power controller 13 may be applied to some components (the valve driver 17 and the first inverter 19), as necessary. In addition, although power is illustrated as not being applied to the wake-up part 14, the communication part 15, and the interface 16 for convenience, and power may be directly applied from the first power supply 50 or power may be applied from the power controller 13.

The wake-up part 14 may transmit a wake-up signal to the power controller 13 on the basis of a starting ON signal transmitted from a starting device (not shown), a door opening signal transmitted from a door opening/closing switch, or a signal transmitted from at least one among various sensors disposed in the vehicle, and the power controller 13 may supply power to the controller 11 in response to the wake-up signal.

In addition, when braking control such as anti-lock braking, emergency braking, parking braking, and the like is required during traveling, the wake-up part 14 transmits a wake-up signal to the power controller 13 on the basis of a corresponding signal, and the power controller 13 may supply power to the controller 11 in response to the wake-up signal.

In addition, in a state in which an ignition switch (not shown) of the vehicle is turned off, all lamps of the vehicle are turned off, an input of a remote control key does not occur, the communication part 15 is turned off, and the like, the wake-up part 14 may transmit a signal notifying a corresponding situation to the power controller 13, and in the case of the corresponding situation, the power controller 13 may interrupt the power supplied from the first power supply 50 to the first area 10 to control a sleep mode to be performed. Consequently, it is possible to prevent discharging of the first power supply 50.

The controller 11 usually maintains a standby mode, and when the wake-up signal is received from the wake-up part 14, the controller 11 may immediately switch from the standby mode to a braking control state. That is, the vehicle usually maintains the controller 11 in the standby mode, thereby reducing leakage current consumption.

To this end, the controller 11 may provide an OFF signal to the switch such that the first power supply 50 interrupts a supply of power in a standby mode. To this end, a first interrupter 35 may be disposed in the first region 10 to interrupt a supply of power from the first power supply 50 under the control of the controller 11.

The first interrupter 35 may be provided at an output terminal of the first power supply 50 as shown in FIG. 3A or may be provided at a 12 V ground terminal as shown in FIG. 3B. When the controller 11 is linked with other systems, the communication part 15 is a communication module which transmits and receives information between the controller 11 and other systems. For example, the communication part 15 may transmit and receive data to and from other systems through a controller area network (CAN) communication method, but the present invention is not limited thereto, and the communication part 15 performs communication using various protocol methods used in vehicles. In this case, other systems which communicate with the communication part 15 may be, for example, an engine management system (EMS), a transmission control unit (TCU), and the like.

The interface 16 may receive an analog or digital input from other apparatuses of the vehicle and provide the analog or digital input to the controller 11 or may provide an analog or digital output from the controller 11 to other apparatuses.

The valve driver 17 may control a valve (not shown) constituting the braking apparatus under the control of the controller 11 and supply or discharge a hydraulic pressure to the wheel cylinder 4 installed on the wheel 5, thereby controlling a braking force applied to the wheel 5. The valve driver 17 may directly receive power from the first power supply 50.

The first motor driver 18 may control the first inverter 19 which provides power to the first motor 19a. In one embodiment of the present invention, the first motor driver 18, the first inverter 19, and the first motor 19a may constitute a parking brake. In this case, the parking brake may be a motor-on-caliper (MoC) type EPB.

Usually, an MoC parking brake includes a disc-shaped brake disc which is installed on the wheel 5 of the vehicle and rotated together with the wheel 5, and a pair of pads which are installed on both sides of the brake disc to generate a braking force through a frictional force with the brake disc. Here, the pair of pads may be disposed to opposite to each other with the brake disc interposed therebetween.

Meanwhile, the parking brake is a brake used for parking and does not require rapid responsiveness so that, unlike the main service brake, it is safe to apply low voltage power to the first motor driver 18 and the first inverter 19 which constitute the parking brake.

When a parking switch is turned on by the user, a parking setting signal may be transmitted to the controller 11 through the communication part 15, and the controller 11 may drive the first motor driver 18 in response to the parking setting signal. In response to a control signal of the first motor driver 18, the first inverter 19 may output a predetermined output signal, and the first motor 19a may be driven in response to the predetermined output signal to contact the pair of pads to the brake disc, thereby generating the braking force.

The controller 11 may be operated by receiving power from the first power supply 50 and may output a control signal for controlling the braking force applied to the wheel 5.

The isolator 40 may insulate the controller 11 from the second motor driver 21 and provide the control signal, which is output from the controller 11, to the second area 20. In addition, the isolator 40 may transmit a failure signal, which is transmitted from the second motor driver 21, to the controller 11.

Specifically, in response to the failure signal transmitted from the second motor driver 21 through the isolator 40, the controller 11 may provide an OFF signal to the switch to allow the second power supply 60 to interrupt a supply of power. To this end, a second interrupter 25 may be disposed in the second area 20 to interrupt the supply of power of the second power supply 60 under the control of the controller 11.

In addition, the controller 11 determines a braking intent of the user on the basis of pressure information received from a pressure sensor 70 or a PTS 75. When it is determined that there is no braking intent, the controller 11 may provide an interruption signal to the second interrupter 25 through the isolator 40. In response to the interruption signal, the second interrupter 25 may interrupt the second power supply 60 from applying the power to the second motor driver 21, thereby preventing the discharge of the second power supply 60.

The second interrupter 25 may be provided at an output terminal of the second power supply 60 as shown in FIG. 3A or may be provided at a 48V ground terminal as shown in FIG. 3B.

In addition, the controller 11 may transmit a synchronization signal to the second motor driver 21 through the isolator 40. In addition, the controller 11 may transmit a pulse width modulation (PWM) control signal to the second motor driver 21 through the isolator 40 so as to allow the second motor driver 21 to drive the second inverter 22.

The isolator 40 may be formed in the form of a chip and may be any one among a capacitive isolator, an inductive isolator, and an optical isolator.

Here, the capacitive isolator may perform a relatively high level of insulation and, simultaneously, transmit a signal through an electric field by integrating a multilayer silicon oxide-based capacitor in the capacitive isolator.

In addition, in the inductive isolator, a pair of inductors may insulate two circuits from each other and transmit a signal through a magnetic flux.

In addition, the optical isolator is a photo coupler in which a light emitting element and a light receiving element insulate two circuits from each other and convert electrical signals into light to transmit the light.

The second motor driver 21, the second inverter 22, and the second motor 80 may constitute the main service brake. Here, the main service brake is used when a vehicle is decelerated or stopped during traveling and operated by stepping on the brake pedal 2.

In addition, the second motor 80 constituting a service brake may be used in the ABS and the ESC system which add a braking force without driver intervention.

The second motor driver 21 and the second inverter 22 may be disposed in the second area 20 for receiving power from the second power supply 60, the second motor driver 21 may provide a driving signal for driving the second inverter 22 in response to the PWM control signal of the controller 11, and the second inverter 22 may provide power for driving the second motor 80 in response to the driving signal of the second motor driver 21.

The second inverter 22 may convert direct-current (DC) power supplied from the second power supply 60 into alternating-current (AC) power in response to the driving signal of the second motor driver 21 and may supply the AC power to the second motor 80. That is, the second inverter 22 is a component for supplying three-phase power to the second motor 80, and six switching elements may be disposed in the second inverter 22 according to a predetermined topology. In one embodiment of the present invention, an example in which the six switching elements of the second inverter 22 are disposed in a three-phase full-bridge method has been described, but the present invention is not limited thereto.

In one embodiment of the present invention, the second motor 80 is illustrated as being disposed outside the second area 20, but may be disposed in the second area 20.

The MPS 82 may detect a position of a rotation angle of the second motor 80 and provide the detected position to the controller 11 to allow the detected position to be used for control. Here, since the MPS 82 located close to the second motor 80 is located outside the second area 20, the MPS 82 is illustrated as directly transmitting a signal to the controller 11 of the first area 10 without passing through the isolator 40, but the present invention is not limited thereto, and when the second motor 80 and the MPS 82 are disposed in the second area 20, the MPS 82 may provide the position of the rotation angle of the second motor 80 to the controller 11 through the isolator 40.

In particular, since the MPS 82 detects the position of the rotation angle of the second motor 80 outside of the second area 20 in a non-contact manner, even when a signal is transmitted without passing through the isolator 40, the first area 10 and the second area 20 may be separated from each other in a circuit or physical manner.

In addition, the current sensor 85 may detect an output current of the second inverter 22 provided to the second motor 80 and provide the output current to the controller 11. For example, the current sensor 85 may be an IC-type Hall sensor and may be disposed outside the second area 20. That is, the current sensor 85 may not be a component which receives power from the second power supply 60.

Thus, the current sensor 85 may detect the output current of the second inverter 22 supplied to the second motor 80 and directly transmit information on a current provided to the second motor 80 to the controller 11 without passing through the isolator 40.

Here, since the current sensor 85 is a Hall sensor and detects the output current of the second inverter 22 outside the second area 20 in a non-contact manner, even when the current sensor 85 transmits a signal without passing through the isolator 40, the first area 10 and the second area 20 may be separated from each other in a circuit or physical manner.

The controller 11 may receive information on the position of the rotation and the information on the current of the second motor 80 provided from the MPS 82 and the current sensor 85 and use the pieces of received information as control information of the second motor 80.

In this case, when the MPS 82 is not disposed in the second area 20 for receiving power from the second power supply 60, the MPS 82 may receive power supplied from the first area 10. For example, a low voltage converted by the power converter 12 may be supplied to the MPS 82.

In addition, when the current sensor 85 is also not disposed in the second area 20 for receiving power from the second power supply 60, the current sensor 85 may receive power supplied from the first area 10. For example, a low voltage converted by the power converter 12 may be supplied to the current sensor 85. In this case, the power applied to the MPS 82 may be different from the power applied to the current sensor 85, and the power applied to the current sensor 85 may be slightly greater than the power applied to the MPS 82. For example, the power applied to the MPS 82 may be 3.3 V, and the power applied to the current sensor 85 may be 5 V. This power may be power converted from each power supplied from the first power supply 50 by the power converter 12.

As described above, when compared to a conventional control apparatus, since a high voltage power supply is applied, the braking apparatus according to one embodiment of the present invention may decrease a current so that a reduction in volume of electrical wires, a reduction in carbon dioxide through miniaturization of the control apparatus, an increase in fuel efficiency and a rapid response may be expected.

In particular, the braking apparatus according to one embodiment of the present invention may apply high voltage power to the second motor driver 21 and the second inverter 22 which constitute the main service brake to improve responsiveness of the main service brake, thereby quickly responding to a dangerous situation.

In addition, in the braking apparatus according to one embodiment of the present invention, electronic components receiving power from a low voltage power supply may be separated from electronic components receiving power from a high voltage power supply in a circuit or physical manner so that two different types of power may be stably provided on a single circuit board and the risk due to coexistence of the two different types of power may be eliminated.

Meanwhile, in one embodiment of the present invention, an example in which the electronic components for receiving power from the low voltage power supply and the electronic components for receiving power from the high voltage power supply are disposed in separate areas in the braking apparatus has been described, but the present invention is not limited thereto, and when electronic devices for receiving power having different magnitudes applied from a vehicle system are disposed on a single circuit board, the braking apparatus may be used in various ways. For example, the braking apparatus may be applied to a belt driven starter and generator (BSG) system and a low DC-DC converter (LDC) system which use both a high voltage power and a low voltage power.

As described above, when compared to a conventional control apparatus, since a high voltage power supply is applied, there is an effect in that a braking apparatus according to the present invention can decrease a current so that a reduction in volume of electrical wires, a reduction in carbon dioxide, an increase in fuel efficiency and a rapid response can be expected.

In addition, in accordance with the braking apparatus according to the present invention, there is an effect in that electronic components receiving power from a low voltage power supply can be separated from electronic components receiving power from a high voltage power supply in a circuit or physical manner so that two different types of power can be stably provided on a single circuit board and the risk due to coexistence of the two different types of power can be eliminated.

Although the exemplary embodiments of the present invention have been described, the spirit of the present invention is not limited to the exemplary embodiments disclosed herein, and it should be understood that numerous other embodiments can be devised by those skilled in the art that will fall within the same spirit and scope of the present invention through addition, modification, deletion, supplement, and the like of a component, and also these other embodiments will fall within the spirit and scope of the present invention.

What is claimed is:

1. A braking apparatus comprising:
a controller disposed in a first area of a circuit board to which first power is applied from a first power supply and configured to output a control signal for controlling a braking force applied to a wheel;
a driver disposed in a second area of the circuit board to which second power that is greater than the first power is applied from a second power supply and configured to output a driving signal for driving a motor in response to the control signal; and
an isolator configured to insulate the controller from the driver and transmit the control signal to the driver,
wherein a terminal through which the first power is applied to the first area is separated from a terminal through which the second power is applied to the second area, and
a ground of the first area is separated from a ground of the second area.

2. The braking apparatus of claim 1, further comprising:
a converter disposed in the first area and configured to convert the first power; and
a power controller disposed in the first area and configured to provide the converted first power to the controller.

3. The braking apparatus of claim 2, further comprising a wake-up part disposed in the first area and configured to transmit, when braking control is required, a wake-up signal to the power controller on the basis of a corresponding signal,
wherein the power controller provides the converted first power to the controller in response to the wakeup signal.

4. The braking apparatus of claim 1, further comprising an inverter disposed in the second area and configured to convert the second power into alternating-current (AC) power and provide the AC power to the motor in response to the driving signal.

5. The braking apparatus of claim 4, further comprising a first sensor configured to detect information on a position of a rotation angle of the motor,
wherein the first sensor is disposed outside the second area and separates the first area from the second area in a circuit or physical manner.

6. The braking apparatus of claim 5, wherein the first sensor directly transmits the information on the position of the rotation angle of the motor to the controller.

7. The braking apparatus of claim 5, wherein the first sensor receives the first power converted by the converter.

8. The braking apparatus of claim 4, further comprising a second sensor configured to detect an output current of the inverter,
 wherein the second sensor is disposed outside the second area and separates the first area from the second area in a circuit or physical manner.

9. The braking apparatus of claim 8, wherein the second sensor directly transmits the output current to the controller.

10. The braking apparatus of claim 8, wherein the second sensor receives the first power converted by the converter.

11. The braking apparatus of claim 1, further comprising an interrupter configured to interrupt the second power from being applied to the driver,
 wherein the controller transmits an interruption signal of the interrupter through the isolator on the basis of pressure information received from outside of the first area.

\* \* \* \* \*